Patented June 19, 1945

2,378,880

UNITED STATES PATENT OFFICE 2,378,880

NITROGENOUS ORGANIC COMPOUNDS AND PROCESS OF MAKING SAME

Arthur W. Burwell and James Allan Camelford, Niagara Falls, N. Y., assignors to Alox Corporation, New York, N. Y., a corporation of New York No Drawing. Application November 13, 1940, Serial No. 365,540

2 Claims. (Cl. 260—583)

This invention relates to amino-derivatives of saturated aliphatic alcohols and saturated aliphatic ketones, and is particularly concerned with the provision of amino-derivatives of the alcohols and/or ketones of oxidation mixtures such as may be produced by the controlled, liquid-phase, partial oxidation of mineral hydrocarbon mixtures (e. g., a petroleum fraction) by the process disclosed in U. S. Patent No. 1,690,769 to Arthur W. Burwell. The invention includes both process aspects and product aspects, and likewise compositions containing the novel amino-derivatives.

It is to be understood that by the practice of the Burwell process upon a starting material consisting essentially of a mixture of saturated hydrocarbons, such as a petroleum wax or a petroleum distillate (light, or heavy) there is produced an oxidation reaction mixture which is composed of two main classes of compounds, viz., (1) a mixture of so-called "saponifiables" including saturated aliphatic carboxylic acids, saturated aliphatic hydroxy carboxylic acids, and esters and lactones of said acids, and (2) a mixture of "unsaponifiables" including saturated aliphatic alcohols, saturated aliphatic ketones, saturated aliphatic keto-alcohols and some unoxidized (original) hydrocarbons. The latter mixture—the "unsaponifiables"—may be separated, more or less completely, from the "saponifiables" by appropriate treatment of the whole oxidation reaction mixture with aqueous caustic alkali at elevated temperature and separation of the resulting supernatant oily layer (composed of the unsaponifiable compounds) from the subnatant aqueous layer (composed of soaps of the saponifiable compounds). The present invention is concerned specifically with the production of amino-compounds in, and at the expense of the alcohols and/or ketones of, the "unsaponifiables" portions of such oxidation reaction masses derived from mixtures of saturated aliphatic hydrocarbons of molecular weights corresponding to from 5 to, say, 36 carbon atoms per molecule.

According to the present invention, to the "unsaponifiables" portion of the oxidation reaction mixture there is added, in excess, a reactive amide, e. g., formamide; the resulting mixture is heated gradually, at progressively increasing temperature, until the water has been driven off and until the mixture has attained a temperature of approximately 180° C., whereupon the mixture is maintained at about the latter value for from 4 to 10 hours. It is noted, here, that use of temperatures in excess of 180° C., is undesirable because such temperatures tend to favor formation of cyanides in the mixture. When the reaction is completed, the reaction mixture is cooled and is washed with water. The excess of formamide may, if desired, be recovered from the wash water. The washed material is then treated at elevated temperature, e. g., refluxed, with dilute mineral acid, e. g., dilute hydrochloric acid, for about 2 hours, during which interval components of the material are hydrolyzed—as is shown by solution of a portion of the total mass in the aqueous layer, which separates, upon standing, from an oily or non-aqueous layer, which latter demonstrably contains the unoxidized hydrocarbons and the alcohols of the original crude oxidation reaction mixture together with a minor amount of unreacted ketones. The aqueous layer, rich in amine hydro-chlorides, is treated with cold caustic alkali and then steam distilled to convert amine hydro-chlorides to amines.

The resulting aminated product is a mixture of many compounds, which mixture defies separation into individual components and identification of those individual components. That it contains amino-compounds is demonstrable by the Kjeldahl ammonia determination method. It is believed that the amines may be represented by the general formula

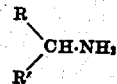

where R and R' are alkyl radicals the sum of whose carbon atoms (per molecule of the amine) exceeds 5 and averages between 12 and 24.

The above referred to "oily or non-aqueous layer" may be, and preferably is, subjected to the following further treatment for producing amino-compounds from the contained alcohols: the insoluble material, after being washed with water and dried, is treated with halogen acid, e. g., an aqueous solution of hydrobromic acid, or anhydrous HCl gas, until no further water is evolved, for the purpose of converting alcohols to their corresponding alkyl halides. Sodium cyanamide solution is then added to the mixture and is reacted with the alkyl halides thereof, in the presence of a suitable non-aqueous liquid medium, e. g., methyl alcohol, in a still fitted with reflux condenser and draw-off, so as to produce dialkyl cyanamides from the halides. Sodium halide is separated from the mixture, and the latter is subjected to a treatment designed to hydrolyze the dialkyl cyanamides content thereof, by treating the mixture with aqueous mineral acid (e. g., sulphuric acid), for the purpose of producing secondary dialkyl amines (of the type R₂NH).

It is believed that where the alcoholic compounds contain two spaced hydroxyl groups along the chain, both hydroxyls may be replaced, to the production of saturated heterocyclic amino compounds.

Obviously, the above cyanamide process may be practiced upon the whole "saponifiables" mass instead of upon the residue from the ketone-converting process as described.

As was mentioned above, the product, in each case, is a mixture rich in compounds affirmatively answering to established tests for organic amines and containing also many other different organic compounds, which mixture—so far in our researches—defies our attempts to separate it into its individual components. We have, nevertheless, found that the relative concentration of amines in the mixture may, in general, be increased by steam distillation of the mixture in those cases where the volatilities of the amines are sufficient to permit distillation.

The products are solid to semi-liquid to liquid materials (depending on the size of the molecule) definitely alkaline to phenolphthalein, and are completely miscible with hydrocarbon oils (e. g. petroleum distillates) in all proportions. The aminated products from the alcohol- and/or ketone-containing unsaponifiable mixtures in which the average compounds contain from 5 to 8 carbon atoms per molecule are miscible with water and with aqueous mineral acid. Those from higher molecular weight mixtures (e. g., compounds containing from 9 to, say, 36 carbon atoms per molecule) are, in general, immiscible with water; they are, however, completely miscible with mineral hydrocarbon liquids. The aminated products, per se, have value as means for preventing corrosion of metal (e. g., steel and iron) parts; moreover, they are adapted for use in corrosion-preventing compositions comprising other corrosion-preventing means. Thus, it has been found that they are adapted to be incorporated in the corrosion-preventing compositions described and claimed in U. S. Patent No. 2,128,523 to Arthur W. Burwell; use of the aminated products in such compositions has been found effective for neutralizing any acids which may inadvertently be present in the same, whereby to provide a strictly non-acid corrosion-preventing composition meeting the most rigid requirements. Where such a corrosion-preventing composition is to be employed on the inner surfaces of used airplane engine cylinders to be maintained in standby condition for long or short periods, we incorporate into the composition a substantial proportion of the aminated products for neutralizing the hydrobromic acid or iron bromide which may persist on said surfaces, or in the pores of the metal, in the upper regions of the cylinders, from the combustion of "leaded gas" containing dibromethylene or the like.

These compositions rich in amines find particular utility as effective yet inexpensive corrosion inhibitors in acidic pickling baths, and as preparations for after-treating pickled metal parts (to neutralize and fix residues of pickling acid left by indifferent or insufficient washing of the pickled metal parts).

The invention will be described with greater particularity with reference to the following examples:

EXAMPLE 1

300 grams of the unsaponifiable portion of the oxidation mass from a 45° Bé. distillate were mixed intimately with 80 grams or formamide at 175° C., for approximately 5 hours, using mechanical agitation. At the end of this time the reaction mass was washed thoroughly to remove excess formamide, and then hydrolyzed by refluxing with 500 c. c. of 5% hydrochloric acid for 2 hours. The lower acid layer was run off into a separate vessel and retained. The hydrolyzed mixture was washed 3 times with successive small quantities of water until the lower water layer showed no qualitative test for chlorides by the silver nitrate method.

Determination of nitrogen by the Kjeldahl method showed the presence of .57% N₂ in the water-insoluble portion.

To 500 c. c. of 10% hydrochloric acid were added 5 grams of the above water-insoluble aminated product. A clean strip of steel was introduced into the acid-amine mixture at room temperature and at the end of 5 days showed absolutely no signs of corrosion due to the acid. A blank test was conducted in the same type of vessel, using the same quantity and concentration hydrochloric acid with a piece of steel identical in composition and surface dimensions. Corrosion occurred immediately with the evolution of hydrogen and at the end of 24 hours the immersed portion had shown the effects of the acid immersion to an extreme degree.

The 5% hydrochloric acid which had been used for the hydrolysis of the formyl derivative was taken, and the HCl concentration increased to 10%. A piece of steel identical with those used in the above tests was introduced into this acid. At the end of 5 days there was absolutely no indication of corrosion or attack.

A check corrosion test was made using uninhibited 10% HCl and using 10% HCl to which 1% of the water-insoluble aminated product had been added. At the end of 1 hour's immersion at room temperature a piece of steel had lost .45% of its weight in the 10% hydrochloric acid. In the acid inhibited with the amine the loss of weight in a piece of steel of approximately identical surface area was .003%.

EXAMPLE 2

300 grams of the unsaponifiable portion of the oxidation mass from a 45° Bé. distillate was treated with 250 grams of hydrobromic acid (48%) and 70 grams of concentrated sulphuric acid. The mixture was refluxed gently for 6 hours and then the mass was washed until the water wash was free from sulphuric acid as determined by the barium chloride test. To the water-insoluble mass consisting of unchanged hydrocarbons, ketones and alkyl bromides was then added a solution of sodium cyanamide (prepared in the manner described in Organic Syntheses, Collective volume 1, Gilman, page 197), together with 600 c. c. of 95% ethyl alcohol, denatured. This mixture was refluxed for a period of 3 hours at the end of which time about 500 c. c. of the alcohol-water were distilled off. The reaction mixture was then filtered, the filter washed with a small amount of alcohol and the filtrate extracted with benzene. The benzene solution was then separated from the lower layer, the benzene distilled off, leaving a mixture of hydrocarbons, ketones and di-alkyl-cyanamides. 500 c. c. of 15% sulphuric acid were added to the di-alkyl-cyanamide mass and the mixture refluxed gently, to prevent bumping, for a period of 6 hours. At the end of this time the mass was cooled to room temperature, and 550 c. c. of 30% caustic soda solution were added down the side of the vessel so that most of it settled to the bottom without mixing with the reaction mass. Mixing was then accomplished by means of gentle stirring when the amine all rose to the upper layer. The lower layer was drained off and the mass washed with successive small quantities of water until free from sulphate by the barium chloride test. The amine mass was then carefully dried. A Kjeldahl determination on the amine mass showed a nitrogen content of .42% $N_2$.

The corrosion-inhibiting property of the aminated products of Examples 1 and 2 is numerically illustrated in the following table:

Table

| Solution 5% $H_2SO_4$ | Loss in wt. per specimen | Percent efficiency |
| --- | --- | --- |
| No inhibitor | 2.7872 | 0 |
| .5% aminated product of Example 1 | 0.0287 | 98.7 |
| .5% same | 0.0205 | 99.3 |
| 1.0% same | 0.0343 | 98.9 |
| .5% aminated product of Example 2 | 0.0707 | 97.4 |
| 1.0% same | 0.0778 | 97.1 |

While the aminated products were desirably effective in preventing solution of the metal, it has been demonstrated that they do not prevent solution of scale or oxide film on the surface of the metal. They are effective through a wide range of concentration, even down to as little as 0.1%.

Relative to the above tests, it is here noted that a very substantial inhibiting effect is had by associating with the acid pickling bath about 1% by weight of the water-insoluble aminated products from the "unsaponifiables" from oxidized scale wax (where the hydrocarbon chains contain as many as 26 or 28 carbon atoms per molecule). Even though these very high molecular weight aminated products are quite insoluble in water, they nevertheless show considerable corrosion-inhibiting effect in a 5% $H_2SO_4$ pickling bath.

We claim:

1. Process of preparing a mixture of water-insoluble but oil-soluble saturated aliphatic amines from the ketones contained in an unsaponifiable mixture of unoxidized hydrocarbons, alcohols, and a plurality of different water-insoluble saturated aliphatic ketones of the general formula

wherein R and R' are alkyl radicals the sum of whose carbon atoms averages between 12 and 24;

which comprises treating said mixture of hydrocarbons, alcohols and ketones with formamide in excess, at a temperature between 100° C. and 180° C., for several hours, removing excess formamide from the resulting reaction mixture by washing the latter with water, hydrolyzing components of the washed material by treating the latter with an aqueous solution of a mineral acid at elevated temperature and thereafter allowing the reaction mixture to separate into a non-aqueous layer containing the hydrocarbons and the alcohols of the original starting material and an aqueous acidic layer containing hydrolyzed components of the reaction mixture, separating the aqueous layer from the non-aqueous layer, and treating the aqueous layer with dilute caustic alkali in the cold whereby the hydrolyzed components are converted to a mixture of water-insoluble but oil-soluble amines.

2. As a new product, a water-insoluble but petroleum-soluble composition consisting essentially of amino derivatives of a mixture of different saturated aliphatic ketones averaging between 12 and 24 carbon atoms per molecule, said composition having corrosion-inhibiting properties and being obtained by the process defined in claim 1.

ARTHUR W. BURWELL.
JAMES ALLAN CAMELFORD.